(12) United States Patent
Zhang et al.

(10) Patent No.: US 12,348,264 B2
(45) Date of Patent: Jul. 1, 2025

(54) OPTICAL FIBER TIME DOMAIN REFLECTOMETER OTDR, TEST SYSTEM, TEST METHOD, AND STORAGE MEDIUM

(71) Applicant: ACCELINK TECHNOLOGIES CO., LTD., Wuhan (CN)

(72) Inventors: Cuihong Zhang, Wuhan (CN); Jiantao Zhang, Wuhan (CN); Zhijun Ye, Wuhan (CN); Tao Xiong, Wuhan (CN)

( * ) Notice: Subject to any disclaimer, the term of this patent is extended or adjusted under 35 U.S.C. 154(b) by 149 days.

(21) Appl. No.: 18/020,238

(22) PCT Filed: Jun. 17, 2021

(86) PCT No.: PCT/CN2021/100624
§ 371 (c)(1),
(2) Date: Feb. 7, 2023

(87) PCT Pub. No.: WO2022/033166
PCT Pub. Date: Feb. 17, 2022

(65) Prior Publication Data
US 2023/0275657 A1    Aug. 31, 2023

(30) Foreign Application Priority Data

Aug. 11, 2020 (CN) .......................... 202010803061.7

(51) Int. Cl.
*H04B 10/071* (2013.01)
*H04B 10/2575* (2013.01)

(52) U.S. Cl.
CPC ....... *H04B 10/071* (2013.01); *H04B 10/2575* (2013.01)

(58) Field of Classification Search
CPC .................................................. H04B 10/071
See application file for complete search history.

(56) References Cited

U.S. PATENT DOCUMENTS 5,966,206 A * 10/1999 Jander .................. H04B 10/071
356/73.1
9,136,941 B2    9/2015 Lee et al.
(Continued)

FOREIGN PATENT DOCUMENTS

CN         102104423 A    6/2011
CN         201876348 U    6/2011
(Continued)

OTHER PUBLICATIONS

F. Chiarello et al., "In-service line monitoring of a colourless wavelength division multiplexed passive optical network," 2016 18th International Conference on Transparent Optical Networks (ICTON), Trento, Italy, 2016, pp. 1-4. (Year: 2016).*
(Continued)

*Primary Examiner* — Nathan M Cors
(74) *Attorney, Agent, or Firm* — Chang & Hale LLP

(57) ABSTRACT

Disclosed are an optical fiber time domain reflectometer (OTDR), a test system, test method, and a storage medium. The OTDR comprises: an input end for receiving an input service optical signal; a first filter connected with the input end and for filtering an interference signal with a wavelength equal to a test wavelength of the OTDR in the service optical signal; a wavelength division multiplexing WDM device having a reflection end, a transmission end and an output end; and an OTDR basic unit connected with the transmission end and used for emitting an OTDR signal equal to a test wavelength and receiving a return signal of the OTDR signal, wherein the output end of the WDM device is for outputting a filtered service optical signal received from the reflection end, outputting the OTDR signal received from the transmission end, and receiving the return signal returned from the optical fiber.

11 Claims, 5 Drawing Sheets

(56) References Cited

U.S. PATENT DOCUMENTS

| | | | | |
|---|---|---|---|---|
| 2004/0013383 A1* | 1/2004 | Ono | ................... | G02B 6/02395 |
| | | | | 385/128 |
| 2012/0243863 A1* | 9/2012 | Zhao | ..................... | H04B 10/40 |
| | | | | 398/16 |
| 2013/0223837 A1* | 8/2013 | Zhang | ................ | H04J 14/0202 |
| | | | | 398/7 |
| 2013/0294768 A1 | 11/2013 | Lee et al. | | |
| 2016/0043798 A1 | 2/2016 | Chen | | |
| 2019/0386753 A1 | 12/2019 | Martel et al. | | |

FOREIGN PATENT DOCUMENTS

| | | |
|---|---|---|
| CN | 102351219 A | 2/2012 |
| CN | 204089819 U | 1/2015 |
| CN | 104935379 A | 9/2015 |
| CN | 107483106 A | 12/2017 |
| CN | 107749777 A | 3/2018 |
| CN | 108020249 A | 5/2018 |
| CN | 108199767 A | 6/2018 |
| CN | 207691810 U | 8/2018 |
| CN | 112054839 A | 12/2020 |
| EP | 3764566 A1 | 1/2021 |

OTHER PUBLICATIONS

International Search Report of PCT/CN2021/100624 filed Jun. 17, 2021.
Written Opinion of the International Searching Authority of PCT/CN2021/100624 filed Jun. 17, 2021.
Search Report of Chinese Priority Application CN 202010803061.7 filed Aug. 11, 2020.

* cited by examiner

OPTICAL FIBER TIME DOMAIN REFLECTOMETER OTDR, TEST SYSTEM, TEST METHOD, AND STORAGE MEDIUM

TECHNICAL FIELD OF THE DISCLOSURE

The present disclosure relates to the technical field of optical communications, and in particular, to an optical fiber time domain reflectometer OTDR, a test system, a test method, and a storage medium.

BACKGROUND

An optical time domain reflectometer (OTDR) is an important test instrument in an optical fiber communication system. The OTDR detects the quality of an optical fiber by analyzing a backscattering signal which is generated by the Rayleigh scattering and the Fresnel reflection of an optical signal when it is transmitting in the optical fiber. The OTDR is widely applied to the maintenance of the optical fiber communication system, detecting parameters such as a length and average loss of an optical fiber, and the like, and positioning faults.

In current optical fiber transmission lines, the data transmission amount is larger and larger, and the information amount borne by optical fibers is sharply increased, real-time detecting and guaranteeing the good condition of optical fiber lines become more and more important. As an effective means of optical fiber line detection, the OTDR is gradually applied to the online detection of optical fiber lines, and regularly detects the optical fiber lines under the condition that the service is not interrupted.

SUMMARY

Embodiments of the present disclosure provide an optical fiber time domain reflectometer OTDR, a test system, a test method, and a storage medium.

The technical solutions of the embodiments of the present disclosure are implemented as follows.

In a first aspect, the embodiments of the present disclosure provide an optical fiber time domain reflectometer OTDR which comprises:
an input end which is used for receiving an input service optical signal;
a first filter which is connected with the input end and is used for filtering an interference signal with a wavelength equal to a test wavelength of the OTDR in the service optical signal;
a wavelength division multiplexing WDM device which has a reflection end, a transmission end and an output end, wherein the reflective end is connected with the first filter and is used for receiving the service optical signal filtered by the first filter; and
an OTDR basic unit which is connected with the transmission end and is used for emitting an OTDR signal with the test wavelength and receiving a return signal of the OTDR signal, wherein an emission parameter of the OTDR signal and a return parameter of the return signal are used for evaluating a performance index of an optical fiber connected with the output end of the WDM device; and
wherein the output end of the WDM device is used for outputting the filtered service optical signal received from the reflection end, outputting the OTDR signal received from the transmission end, and receiving the return signal returned from the optical fiber.

Optionally, the OTDR further comprises:
a second filter which is connected with the OTDR basic unit and is used for filtering an interference signal in the return signal, wherein a wavelength of the interference signal in the return signal is not equal to the test wavelength.

Optionally, the OTDR basic unit comprises:
an emission module which is used for emitting the OTDR signal with the wavelength equal to the test wavelength;
a receiving module which is used for receiving the return signal;
an optical circulator (OC) which is respectively connected with the emission module, the receiving module, and the transmission end of the WDM device; and
a processor which is respectively connected with the emission module and the receiving module, and is used for obtaining the performance index according to the emission parameter of the OTDR signal and the return parameter of the return signal.

Optionally, the optical circulator comprises:
a first port, a second port and a third port;
the first port is connected with the emission module, the second port is connected with the transmission end of the WDM device, and the third port is connected with the receiving module.

In a second aspect, the embodiments of the present disclosure provide a test system based on an OTDR, and the test system comprises:
the OTDR according to one or more of the aforementioned technical solutions;
a service signal emitter which is connected with the input end of the OTDR, and is used for emitting a service optical signal; and
a to-be-detected optical fiber which is connected with an output end of the OTDR.

Optionally, the system further comprises:
a monitoring device which is connected with the OTDR and is used for determining the test wavelength of the OTDR according to a wavelength range of the service optical signal.

Optionally, the monitoring device is further used for:
receiving and displaying a performance index of the to-be-detected optical fiber connected with the output end of the OTDR.

In a third aspect, the embodiments of the present disclosure provide a test method based on an OTDR, and the method comprises:
determining a test wavelength of the OTDR according to a wavelength of a service optical signal;
emitting an OTDR signal to a to-be-detected optical fiber according to the test wavelength;
filtering out an interference signal in the service optical signal which has a wavelength equal to the test wavelength; and
receiving and analyzing a return signal of the OTDR signal returned by the to-be-detected optical fiber, wherein an emission parameter of the OTDR signal and a return parameter of the return signal are used for evaluating a performance index of an optical fiber connected with the output end of the WDM device.

Optionally, the determining a test wavelength of an OTDR according to a wavelength range of a service optical signal comprises:
when the service optical signal is an optical signal amplified by an erbium-doped fiber amplifier EDFA, determining the test wavelength of the OTDR according to the wavelength range of the service optical signal and a spectral distribution of an amplified spontaneous emission ASE signal of the EDFA.

Optionally, the receiving and analyzing a return signal the OTDR signal returned by the to-be-detected optical fiber comprises:

receiving the return signal of the OTDR signal, and recording the return parameter of the return signal, wherein the return parameter comprises return time and return power;

obtaining the emission parameter of the OTDR signal which is pre-recorded by a processor, wherein the emission parameter comprises emission time and emission power;

determining a length of the to-be-detected optical fiber according to the emission time of the OTDR signal and the return time of the return signal; and determining an attenuation distribution curve of the to-be-detected optical fiber according to the emission parameter of the OTDR signal and the return parameter of the return signal.

In a fourth aspect, the embodiments of the present disclosure provide a computer-readable storage medium, wherein the storage medium stores computer-executable instructions, when executed by a processor, capable of implementing the test method according to one or more of the aforementioned technical solutions.

The embodiments of the present disclosure provide an optical fiber time domain reflectometer OTDR, a test system and a test method. The OTDR comprises an input end, a first filter, a wavelength division multiplexing WDM device, an OTDR basic unit, and an output end, wherein the first filter is respectively connected with the input end and the reflection end of the WDM device, and the OTDR basic unit is connected with the transmission end of the WDM device. The first filter filters an interference signal in the service optical signal which has a wavelength equal to the test wavelength of the OTDR; and the WDM device multiplexes the OTDR signal with a wavelength equal to the test wavelength emitted by the OTDR basic unit and the filtered service optical signal and outputs the same, receives the return signal of the OTDR signal, and transmits the return signal to the OTDR basic unit for analyzing and processing.

In a first aspect, the service optical signal is filtered through the first filter, greatly eliminating the interference signal in the service optical signal which has the wavelength equal to the test wavelength under the condition that the service optical signal is not affected, and ensuring that the test of the OTDR is not affected by the service optical signal transmitted in the optical fiber line. As a result, it is suitable for performing the performance detection on the transmission optical fiber under the condition that the service is not interrupted.

In a second aspect, the first filter is integrated within the OTDR, and in this way, the special power supply and the signal interface do not need to be allocated for the first filter, which has the features of being high in compatibility with the related technology, being easy to install and not adding additional apparatus or device.

DETAILED DESCRIPTION

Figure 1:
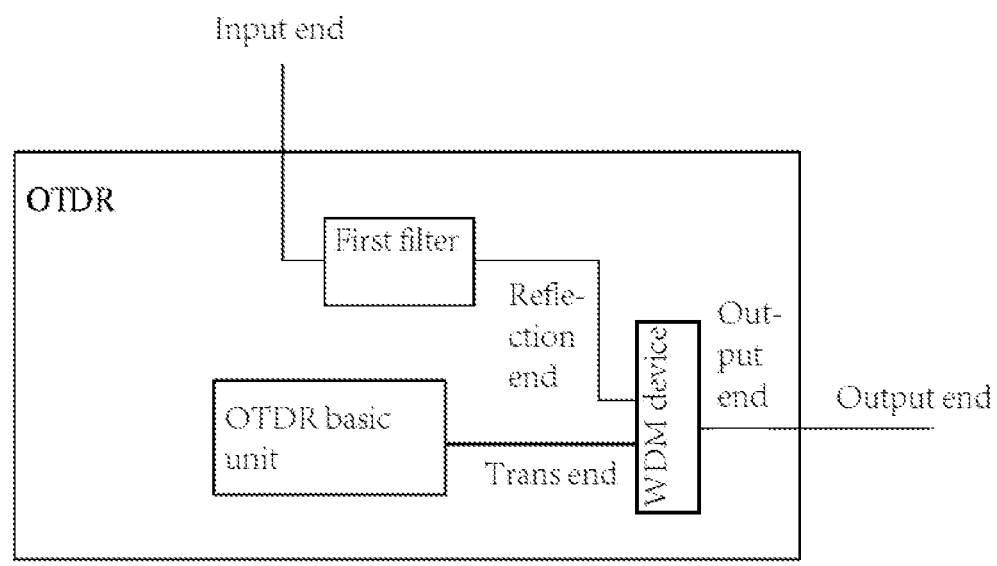
FIG. 1 is a block schematic diagram of a composition structure of an OTDR provided by an embodiment of the present disclosure.

In order to make the object of the present disclosure, the technical solution and advantages clearer, the present disclosure will be further described in detail in combination with the accompanying drawings, and the described embodiments should not be regarded as a limitation for the present disclosure, and all other embodiments obtained by those of ordinary skill in the art on the premise of not making inventive labor belong to the protection scope of the present disclosure.

In the following description, "some embodiments" describe subsets of all possible embodiments. However, it can be understood that "some embodiments" may be the same subsets or different subsets of all possible embodiments, and may be combined with each other without conflict.

In the following description, the relevant terms "first\second\third" are only to distinguish similar objects and do not represent a specific ordering of objects, it can be understood that the "first\second\ third" may be interchanged with a specific order or sequence if allowed, so that the embodiments of the present disclosure described herein may be embodied in an order other than those illustrated or described herein.

Unless otherwise defined, all technical and scientific terms used herein have the same meanings as those generally understood by those skilled in the technical field of the present disclosure. The terms herein are only used for the purpose of describing embodiments of the present disclosure and are not intended to limit the present disclosure.

Due to the fact that the wavelength division multiplexing technology is widely used in the optical fiber transmission system, the number of channels is more and more, and the transmission distance is longer and longer. In order to adapt to longer transmission distances, various optical amplifiers are widely used in optical fiber transmission systems. The spectral distribution of the optical signal in the optical fiber is wide, and the spectral distribution of the noise signal is also relatively wide.

As an effective means of optical fiber line performance detection, the OTDR is widely applied to the optical fiber quality detection, the optical fiber fault point positioning and other occasions, and the online optical fiber line detection function of the OTDR is gradually integrated into an optical fiber transmission system. Due to the great data amount transmitted in the optical fiber line, it is required that the OTDR test should not be interrupted or affect the service signal transmission. However, the test principle of the OTDR is that a return signal is received by using the light Rayleigh scattering and the optical fiber end surface reflection in the optical fiber through a mode of outputting periodic light pulse, and the attenuation and connection condition of the optical fiber line are detected according to the return signal. However, the return signal is very weak. In particular, the power of the return signal at the far end of the optical fiber reaches −70 dBm or less. Due to the application of various amplifiers in the optical fiber transmission systems, the noise in the optical fiber line exists widely and the spectral distribution is very wide. Particularly, when the OTDR test signal and the output signal of the erbium-doped fiber amplifier (EDFA) are transmitted in the same optical fiber in the same direction, the amplified spontaneous emission (ASE) noise generated by the EDFA seriously interferences the test performance of the OTDR, so that the dynamic range of the detection by means of the OTDR is greatly reduced, and the degradation amount of the test performance of the OTDR reaches 10 dB or more.

FIG. 1 is a block schematic diagram of a composition structure of an OTDR provided by an embodiment of the present disclosure. As shown in FIG. 1, the OTDR provided by the embodiment of the present disclosure comprises:

an input end which is configured to receive an input service optical signal;

a first filter which is connected with the input end and is configured to filter an interference signal in the service optical signal which has a wavelength equal to a test wavelength of the OTDR;

a wavelength division multiplexing WDM device which has a reflection end, a transmission end and an output end, wherein the reflective end is connected with the first filter, and is configured to receive the service optical signal filtered by the first filter; and an OTDR basic unit which is connected with the transmission end and is configured to emit an OTDR signal with a wavelength equal to the test wavelength and receive a return signal of the OTDR signal, wherein an emission parameter of the OTDR signal and a return parameter of the return signal are used for evaluating a performance index of an optical fiber connected with the output end of the WDM device;

wherein the output end of the WDM device is configured to output the filtered service optical signal received from the reflection end, output the OTDR signal received from the transmission end, and receive the return signal returned from the optical fiber.

Here, the service optical signal refers to an optical signal for modulating the service data.

In the embodiments of the present disclosure, the filter is an instrument for wavelength selection, and it may select the required wavelength(s) from a plurality of wavelengths, and filter signals of other wavelengths except for the selected wavelength(s) in the optical signal. For example, according to the frequency selection property of the filter, the filter may be divided into a band-pass filter, a band-stop filter, a low-pass filter, a high-pass filter and the like.

It should be noted that the first filter may be implemented by an optical fiber grating filter or a coating filter, wherein the optical fiber grating filter is a kind of optical passive device, which uses the thermal sensitivity of the optical fiber material to generate a refractive index periodic transformation within the fiber core along the axial direction of the fiber core, thus forming a function of narrow-band filtering. The coating filter is a kind of filter that coats a dielectric film with a high refractive index and a low refractive index cross-armed on a quartz glass substrate according to design requirements by using an evaporation coating method, and it uses multi-beam interference of light, to coherently intensify the transmission of an optical signal with a certain wavelength and filter the optical signal with the certain wavelength, and to intensify the optical signal with other wavelengths due to the reflection by interference and then reflect the same, thereby realizing the filtering function.

In a practical application, the first filter may be a band-stop filter, and the band-stop spectral range may be set according to the test wavelength of the OTDR signal; the optical signals with a wavelength range within the band-stop spectral range in the service optical signal is greatly attenuated by the first filter, while the optical signal with a wavelength range outside the band-stop spectral range in the service optical signal may pass through the first filter at low loss.

Figure 2:
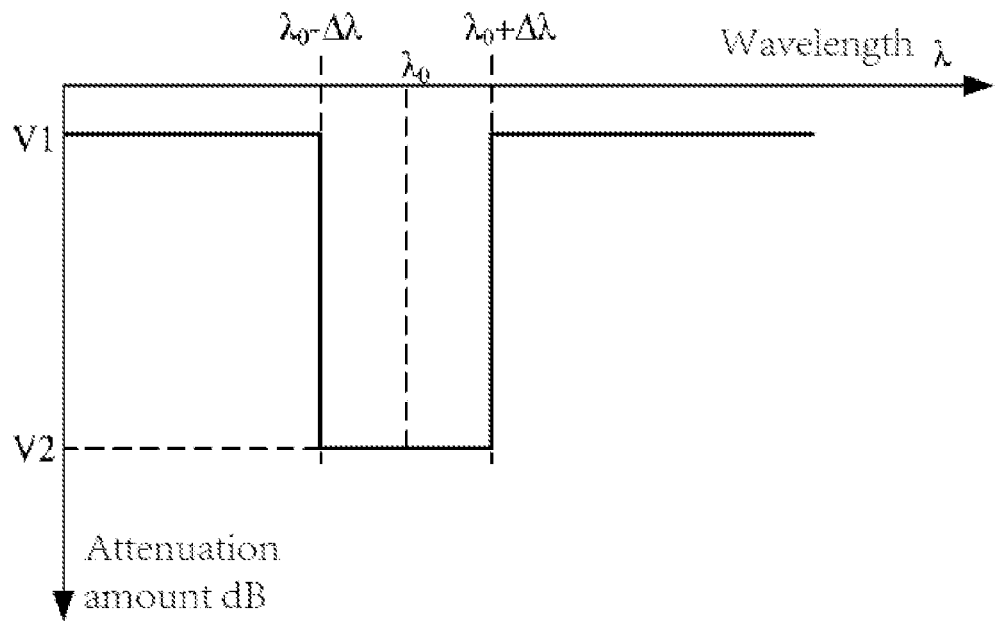
FIG. 2 is an attenuation spectrogram of a first filter within an OTDR provided by an embodiment of the present disclosure.

Exemplarily, FIG. 2 is an attenuation spectrogram of a first filter within an OTDR provided by an embodiment of the present disclosure. As shown in FIG. 2, the center wavelength of the OTDR signal is $\lambda_0$. $\lambda_0 \pm \Delta\lambda$ may be considered as a test wavelength. The band-stop spectral range of the first filter is $\lambda_0 \pm \Delta\lambda$. The first filter will attenuate optical signals with a wavelength range within $\lambda_0 \pm \Delta\lambda$ in the service optical signal, and the attenuation value is V2; optical signals with a wavelength range outside $\lambda_0 \pm \Delta\lambda$ in the service optical signal pass through the first filter at low loss, and the attenuation value is V1. V1 here may be far less than V2. As a result, by performing high-loss processing on the optical signals within $\lambda_0 \pm \Delta\lambda$, it is equivalent to mostly filtering signals in the service signal which interference the test of the OTDR signal with the test wavelength. While V1 being far less than V2 may reduce the loss of the optical signals for modulated service data as much as possible, thereby ensuring the transmission quality of the optical signal modulated with service data.

In the embodiments of the present disclosure, the WDM device may be a passive device and is used for completing multiplexing and demultiplexing of a plurality of optical signals with different wavelengths. For example, it is a prism dispersion type of WDM device or a diffractive optical fiber type of WDM device, etc.

In a practical application, the WDM device comprises a reflecting end, a transmission end and an output end. According to the wavelength of the service optical signal and the wavelength of the OTDR signal, the service optical signal is received from the reflection end of the WDM device, and the OTDR signal is received from the transmission end. In this way, the WDM device attenuates the interference signal with a wavelength equal to the test wavelength in the service optical signal, and attenuates the interference signal outside the test wavelength range in the OTDR signal at the same time.

Figure 3:
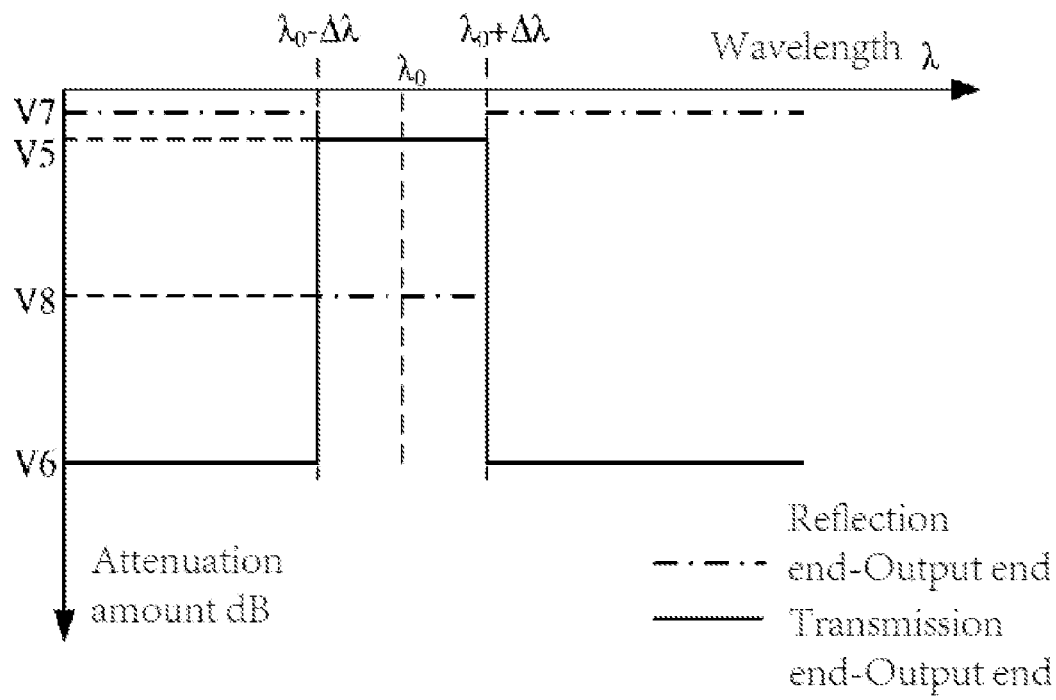
FIG. 3 is an attenuation spectrogram of a WDM device within an OTDR provided by an embodiment of the present disclosure.

Exemplarily, FIG. 3 is an attenuation spectrogram of a WDM device within an OTDR provided by an embodiment of the present disclosure. For the optical signals passing through the reflection end and the output end of the WDM device, the WDM device will attenuate the optical signals with a wavelength range within $\lambda_0\pm\Delta\lambda$, in the optical signal, and the attenuation value is V8; the optical signals with a wavelength range outside $\lambda_0\pm\Delta\lambda$ in the optical signal pass through the WDM device at low loss, and the attenuation value is V7. While for the optical signals passing through the transmission end and the output end of the WDM device, the WDM device will attenuate the optical signals with a wavelength range outside $\lambda_0\pm\Delta\lambda$ in the optical signal, and the attenuation value is V6; the optical signals with a wavelength range within $\lambda_0\pm\Delta\lambda$ in the optical signal pass through the WDM device at low loss, and the attenuation value is V5. V7 here may be far less than V8. As a result, by performing high-loss processing on the optical signals outside $\lambda_0\pm\Delta\lambda$ the signals in the service optical signal that interfere the test of the OTDR signal are filtered. V5 is far less than V6. In this way, by performing high-loss processing on the optical signal outside $\lambda_0\pm\Delta\lambda$, the interference signals with a wavelength range outside $\lambda_0\pm\Delta\lambda$ in the OTDR signal are filtered. V7 being far less than V8 and V5 being far less than V6 may reduce the loss to the service optical signal and the OTDR signal as much as possible, thereby ensuring that the OTDR test does not affect the normal transmission of the service optical signal, and meanwhile, ensuring that the test of the OTDR is not affected by the service optical signal.

In the embodiments of the present disclosure, the first filter is respectively connected with the input end of the OTDR and the reflection end of the WDM device; the transmission end of the WDM device is connected with the OTDR basic unit, and the output end of the WDM device is connected with the output end of the OTDR.

The OTDR receives an input service optical signal through the input end, and filters the service optical signal through the first filter, so as to filter an interference signal with a wavelength equal to a test wavelength of the OTDR in the service optical signal, thereby avoiding that the service optical signal affects the OTDR. An OTDR signal with a wavelength equal to the test wavelength is emitted by the OTDR basic unit, and the filtered service optical signal and the OTDR signal output by the OTDR basic unit are multiplexed through the WDM device, and the multiplexed signal is transmitted to the output end of the OTDR to be output. Meanwhile, the WDM receives a return signal of the OTDR signal and sends the return signal to the OTDR basic unit; the OTDR basic unit evaluates a performance index of the optical fiber connected with the output end of the OTDR according to a return parameter of the received return signal and an emission parameter of the OTDR signal.

Exemplarily, as shown in FIG. 2 and FIG. 3, when the test wavelength of the OTDR is λ0 and the spectral range is $\lambda_0\pm\Delta\lambda$ the service optical signal filtered by the first filter (the optical signal with a wavelength range outside $\lambda_0\pm\Delta\lambda$) is input to the WDM device through the reflection end; after the service signal passes through the first filter and the WDM, for the optical signal with a wavelength range within $\lambda_0\pm\Delta\lambda$ in the service optical signal, the attenuation value is V2+V8; for the optical signal with a wavelength range outside $\lambda_0\pm\Delta\lambda$ in the service optical signal passing through the first filter at low loss, the attenuation value is V1+V7.

In this way, through filtering the interference signal with a wavelength equal to the test wavelength of the OTDR in the service optical signal by means of the first filter, the OTDR greatly reduces the interference signal falling within the test wavelength range of the OTDR in the service optical signal under the condition that the service optical signal is not influenced, so as to ensure that the test performance of the OTDR is not affected by the service optical signal transmitted in the optical fiber line.

In some embodiments, the OTDR further comprises:
a second filter which is connected with the OTDR basic unit and is configured to filter an interference signal in the return signal, wherein a wavelength of the interference signal in the return signal is not equal to the test wavelength.

In a practical application, the second filter may be a band-pass filter, and a pass-band spectral range may be set according to the wavelength of the OTDR test signal; and an optical signal with a wavelength range outside the pass-band spectral range in the return signal is greatly attenuated through the second filter, while an optical signal with a wavelength range within the pass-band spectral range in the return signal may pass through the second filter at low loss.

Figure 4:
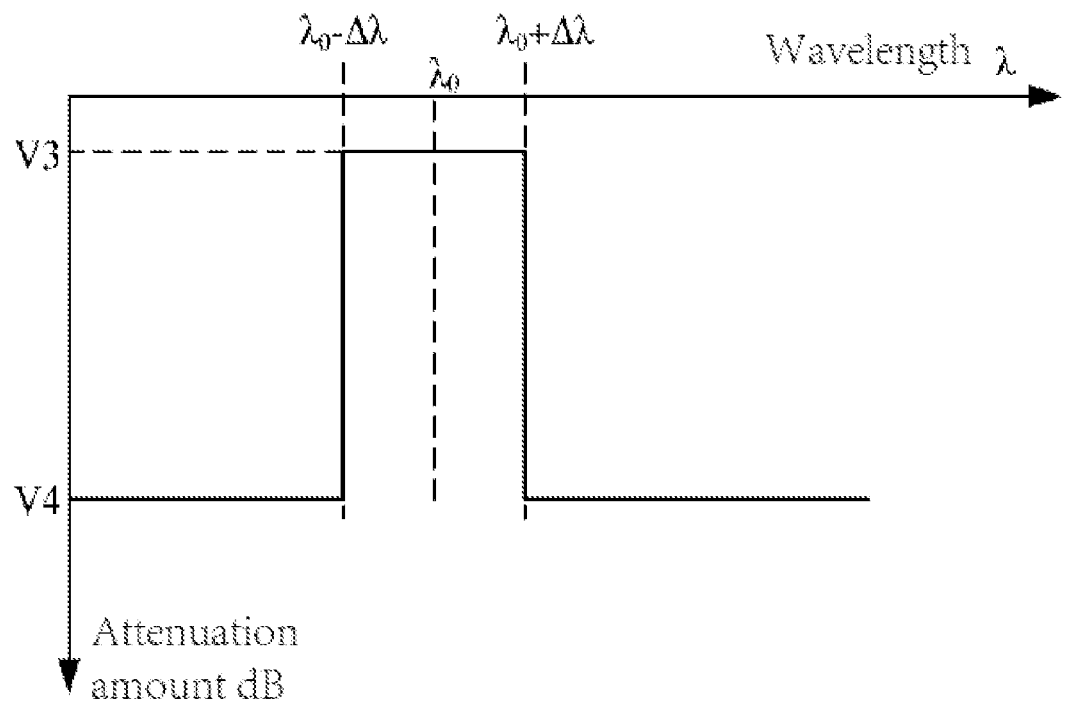
FIG. 4 is an attenuation spectrogram of a second filter within an OTDR provided by an embodiment of the present disclosure.

Exemplarily, FIG. 4 is an attenuation spectrogram of a second filter within an OTDR provided by an embodiment of the present disclosure. As shown in FIG. 4, the center wavelength of the test wavelength of the OTDR is $\lambda_0$. The pass-band spectral range of the second filter is $\lambda_0\pm\Delta\lambda$. The second filter will attenuate the optical signal with a wavelength range outside $\lambda_0\pm\Delta\lambda$ in the return signal, and the attenuation value is V4; the optical signal with a wavelength range within $\lambda_0\pm\Delta\lambda$ in the return signal passes through the second filter at low loss, and the attenuation value is V3. V4 here may be far less than V3. In this way, by performing high-loss processing on the optical signal outside $\lambda_0\pm\Delta\lambda$, it is equivalent to attenuates the optical signal with a wavelength range outside $\lambda_0\pm\Delta\lambda$ in the return signal as large as possible. V4 being far less than V3 may reduce the interference of the reverse Rayleigh scattering signal of the service optical signal on the return signal as much as possible, and ensure that the OTDR test performance is not deteriorated.

In the embodiments of the present disclosure, the second filter is connected with the OTDR basic unit, which is used for filtering the interference signal in the return signal.

The OTDR receives the return signal of the OTDR signal through an output end, and the WDM device receives the return signal through the output end; and the transmission end transmits the return signal to the second filter, and the second filter filters the return signal and then transmits it to the OTDR basic unit.

Exemplarily, as shown in FIG. 3 and FIG. 4, the test wavelength of the OTDR is $\lambda_0$. For the return signal output by the transmission end of the WDM device, the interference signal (the optical signal with a wavelength range outside $\lambda_0\pm\Delta\lambda$) in the return signal is filtered through the second filter. After the optical signal with a wavelength range outside $\lambda_0\pm\Delta\lambda$ in the return signal passes through the WDM device and the second filter, the attenuation value is V6+V4; the optical signal with a wavelength range within λ0±Δλ, in the return signal passes through the WDM device and the second filter at low loss, and the attenuation value is V5+V3.

In this way, the interference signal outside the OTDR test wavelength range in the returned signal of the OTDR is further filtered through the second filter.

In some embodiments, the OTDR basic unit comprises:
an emission module which is configured to emit the OTDR signal with a wavelength equal to the test wavelength;
a receiving module which is configured to receive the return signal;
an optical circulator which is respectively connected with the emission module, the receiving module, and the transmission end of the WDM device;

a processor which is respectively connected with the emission module, the receiving module, and is configured to obtain the performance index according to the emission parameter of the OTDR signal and the return parameter of the return signal.

In the embodiments of the present disclosure, the emission module is an optoelectronic device for electro-optical conversion; for example, it is a pulsed laser, and the like. The emission module comprises a light emitting device, and a driving circuit. After receiving an electric signal, the driving circuit drives the light-emitting device to send an optical signal with a set wavelength according to the received electric signal.

In the embodiments of the present disclosure, the receiving module is an optoelectronic device for photoelectric conversion. For example, it is an avalanche diode, and the like. The receiving module comprises an optical receiving device, a boosting circuit, and a microprocessor (Microcontroller Unit, MCU). The optical receiving device is used for converting an optical signal into an electric signal, such as an avalanche diode, and the like; the boost circuit is used for providing a bias voltage for the optical receiving device; and the MCU is used for controlling the voltage output by the boost circuit.

In the embodiments of the present disclosure, the optical circulator is a multi-port optical device with non-reciprocal property. It at least comprises three ports, and a connected annular channel is formed between the ports of the optical circulator. When an optical signal is input from any port of the optical circulator, the optical signal may be output from the next port at a very small loss according to the transmission direction of the port annular channel, however, the loss from this port to the other ports is large. This transmission direction may be a clockwise direction or a counterclockwise direction.

For example, the transmission direction of the circulator is: from the first port connected with the emission module to the second port connected with the WDM device; and then from the second port to the third port connected with the receiving module.

In the embodiment of the present disclosure, the processor is an execution unit for information processing and program operation, which is used for processing and analyzing the received optical signal, so as to detect parameters such as the performance index of the optical fiber.

In the embodiments of the present disclosure, the optical circulator is respectively connected with the emission module, the receiving module, and the transmission end of the WDM device; and the processor is respectively connected with the emission module and the receiving module.

The processor drives the emission module to emit an OTDR signal, and the OTDR signal is transmitted to the transmission end of the WDM device through the optical circulator, and is multiplexed and output through the WDM device together with the filtered service optical signal. The WDM device transmits a return signal of the received OTDR signal to the receiving module through the optical circulator, and after receiving the return signal, the receiving module sends a return parameter of the return signal to the processor, so that the processor evaluates a performance index of the optical fiber according to the return parameter of the return signal and an emission parameter of the OTDR signal.

Optionally, the return parameter of the return signal comprises return time and return power; and the emission parameter of the OTDR signal comprises emission time and emission power.

In a practical application, the processor records the return time and the return power of the return signal, and calculates an actual length of the optical fiber through the time difference between the return time and the emission time and the transmission speed of the light in the optical fiber according to the emission time and the emission power of the OTDR signal. According to the return power and the return time, an attenuation distribution curve of the optical fiber is drawn.

In this way, the OTDR basic unit emits the OTDR signal and receives the return signal of the OTDR signal, and evaluates the performance index of the optical fiber according to the emission parameter and the return parameter of the OTDR signal, completing the test of the optical fiber.

Optionally, the optical circulator comprises:
a first port, a second port and a third port;
wherein the first port is connected with the emission module, the second port is connected with the transmission end of the WDM device, and the third port is connected with the receiving module.

In the embodiments of the present disclosure, the optical circulator is respectively connected with the emission module, the WDM device, and the receiving module; wherein the first port is connected with the emission module, the second port is connected with the transmission end of the WDM device, and the third port is connected with the receiving module.

The OTDR signal emitted by the emission module is transmitted to the transmission end of the WDM device, and is multiplexed and output with the service optical signal; and the return signal sent by the WDM device is transmitted to the receiving module, so as to evaluate a performance index of the optical fiber according to the return parameter of the return signal.

For example, this performance index includes, but is not limited to, at least one of the following: an actual length of the optical fiber, an attenuation coefficient of the optical fiber, a loss distribution curve of the optical fiber, and a location of a fault point of the optical fiber.

Figure 5:
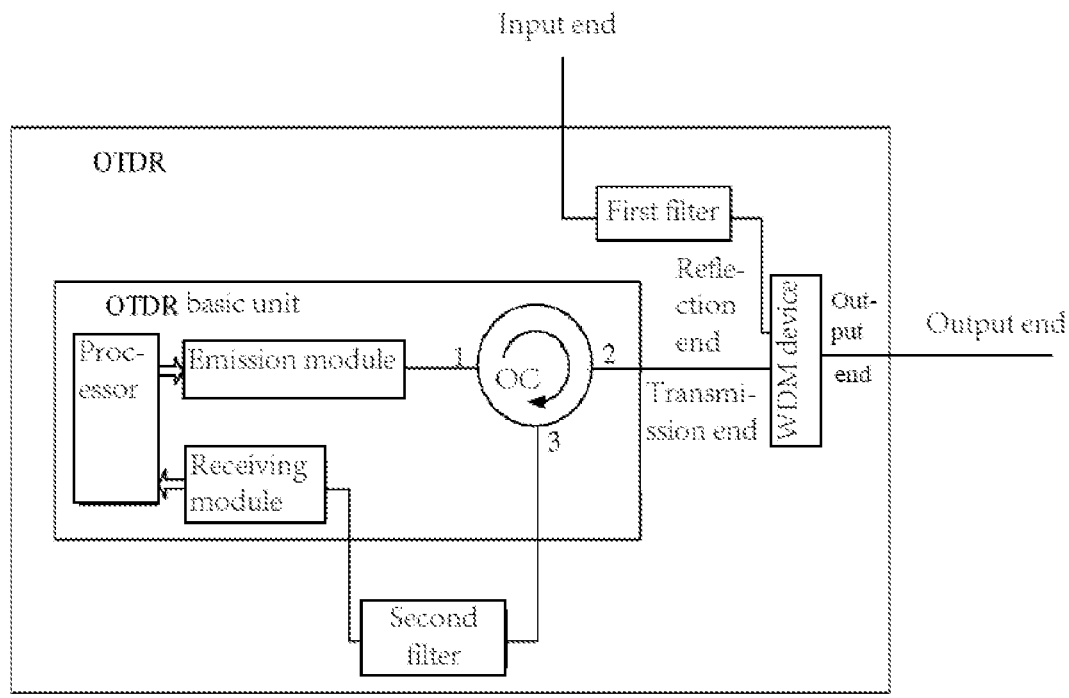
FIG. 5 is a block schematic diagram of an optional composition structure of an OTDR provided by an embodiment of the present disclosure.

In some other embodiments, FIG. 5 is a block schematic diagram of an optional composition structure of an OTDR provided by an embodiment of the present disclosure. As shown in FIG. 5, the second filter is connected in series between the third port of the optical circulator and the receiving module and is used for filtering the interference signal of the return signal.

It should be noted that when the service optical signal and the OTDR signal are transmitted in the same direction, the service optical signal may also generate a Rayleigh scattering signal in the transmission process, and is returned and transmitted to the WDM device. The return signal received by the WDM device comprises both a return signal of the OTDR signal and a return signal of the service optical signal; and the return signal of the service optical signal may cause interference to the test of OTDR. Through the second filter filtering the return signal of the service optical signal in the return signal, it is reduced for the interference of the return signal of the service optical signal to the return signal of the OTDR signal in the transmission system.

In actual implementation, the optical circulator transmits the return signal sent by the WDM device to the second filter, and the second filter filters out the interference signal in the return signal; and the second filter transmits the filtered return signal to the receiving module, so as to evaluate the performance index of the fiber according to the return parameters of the return signals.

In this way, the OTDR signal emitted by the emission module is transmitted to the transmission end of the WDM device through the optical circulator; and the return signal of the OTDR signal received by the WDM device is transmitted to the receiving module, so that the forward transmission and the reverse transmission are separated, and the single-fiber bidirectional communication is realized.

Figure 6:
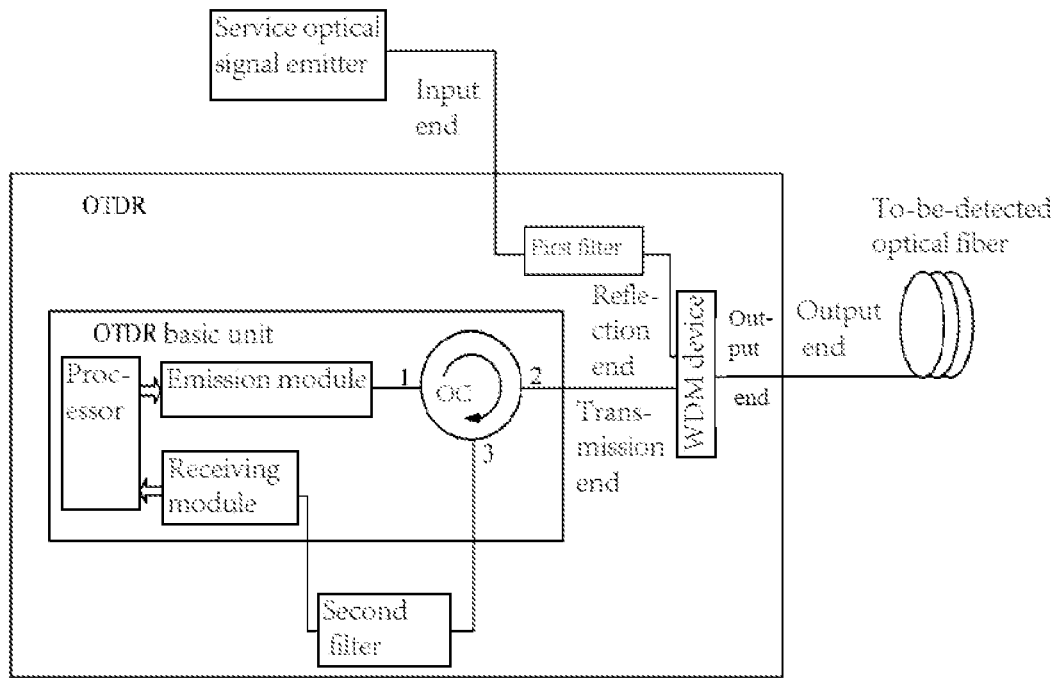
FIG. 6 is a schematic structural diagram of an OTDR-based test system provided by an embodiment of the present disclosure.

Next, the embodiments of the present disclosure provide an OTDR-based test system. As shown in FIG. 6, FIG. 6 is a schematic structural diagram of an OTDR-based test system provided by an embodiment of the present disclosure. The system comprises:
- an OTDR;
- a service signal emitter which is connected with an input end of the OTDR and is used for emitting a service optical signal;
- a to-be-detected optical fiber which is connected with an output end of the OTDR.

In the system, the OTDR-based test OTDR is the OTDR in aforementioned FIG. 1 or FIG. 5.

In the embodiments of the present disclosure, the service signal emitter is connected with the input end of the OTDR, and the output end of the OTDR is connected with the to-be-detected optical fiber.

The OTDR receives the service optical signal emitted by the service signal emitter through the input end, and filters the service optical signal through the first filter, so as to filter out an interference signal with a wavelength equal to a test wavelength of the OTDR in the service optical signal. Moreover, the OTDR basic unit of the OTDR emits an OTDR signal and transmits it to the WDM device; the filtered service optical signal and the OTDR signal are multiplexed and output to the output end of the OTDR through the WDM device, and then transmitted to the to-be-detected optical fiber connected with the output end. The return signal of the OTDR signal returned from the to-be-detected optical fiber is received through the output end, and the return signal is transmitted to the OTDR basic unit through the WDM device, so as to evaluate a performance index of the to-be-detected optical fiber according to a return parameter of the return signal.

Figure 7:
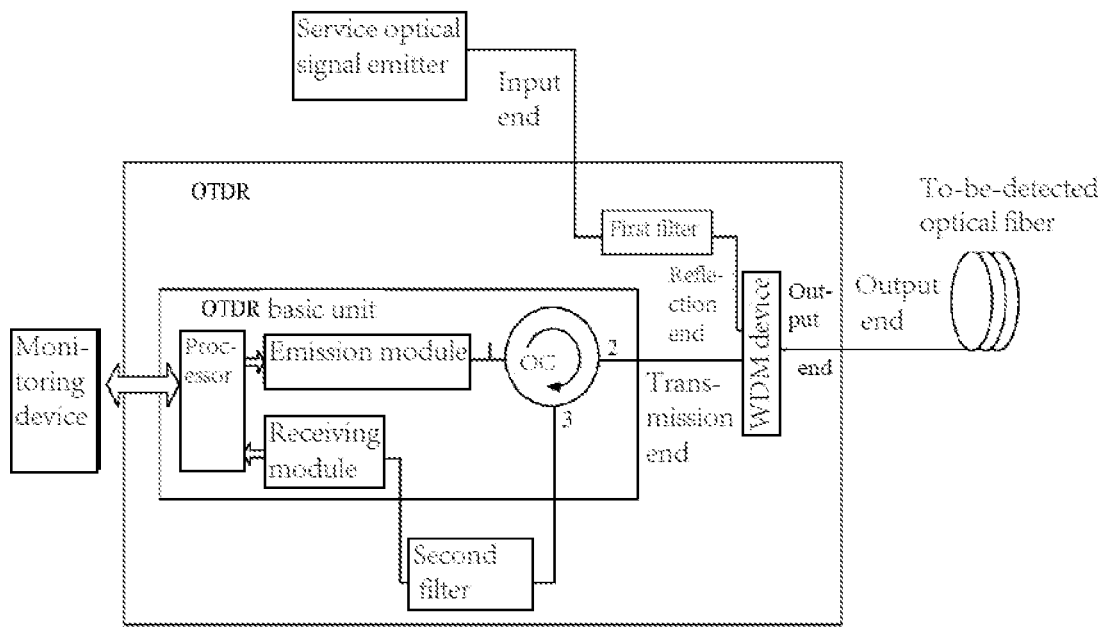
FIG. 7 is an optional schematic structural diagram of an OTDR-based test system provided by an embodiment of the present disclosure.

Optionally, FIG. 7 is an optional schematic structural diagram of an OTDR-based test system provided by an embodiment of the present disclosure. As shown in FIG. 7, the system further comprises:
- a monitoring device which is connected with the OTDR and is used for determining the test wavelength of the OTDR according to a wavelength range of the service optical signal.

In the embodiments of the present disclosure, the monitoring device is connected with a processor of the OTDR. The test wavelength of the OTDR is set through the monitoring device, and the test wavelength information is sent to the processor, then the processor drives the emission module of the OTDR to emit the OTDR signal corresponding to the test wavelength. The monitoring device may determine the test wavelength of the OTDR according to the wavelength range of the service optical signal.

It should be noted that in order to avoid the influence of the test of the OTDR on the service optical signal transmitted by the optical fiber, the test wavelength of the OTDR should be determined according to the wavelength range of the service optical signal transmitted by the optical fiber. For example, the test wavelength of the OTDR should keep away from the DWDM standard wavelength range, the OSC wavelength range and the Raman pump wavelength range, etc., and it is not specifically limited here.

In actual implementation, in order to reach longer test distance, the test wavelength may also be selected in the wavelength range with a low optical fiber attenuation coefficient. For example, it is 850 nm, 1550 nm, and it is not specifically limited here.

In this way, the monitoring device determines the test wavelength of the OTDR according to the wavelength of the service optical signal, thereby ensuring that the test performance of the OTDR is not affected by the service optical signal transmitted in the optical fiber line.

Optionally, the monitoring device is further used for:
- receiving and displaying a performance index of the to-be-detected optical fiber output by the OTDR.

In the embodiments of the present disclosure, the processor evaluates the performance index of the to-be-detected optical fiber according to the return parameter of the return signal and the emission parameter of the OTDR signal after receiving the return parameter of the return signal; and sends the performance index parameter of the to-be-detected optical fiber to the monitoring device for display.

The return parameter of the return signal comprises return time and return power; and the emission parameter of the OTDR signal comprises emission time and emission power.

In actual implementation, the processor calculates an actual length of the to-be-detected optical fiber through the time difference between the return time and the emission time, as well as the transmission speed of the light in the optical fiber, draws an attenuation distribution curve of the optical fiber according to the return power and the return time, and sends the actual length and the attenuation distribution curve of the to-be-detected optical fiber to the monitoring device for display.

As a result, the performance index of the to-be-detected optical fiber is evaluated through the return parameter of the return signal and the emission parameter of the OTDR signal, and the performance index of the to-be-detected optical fiber is displayed more intuitively by the monitoring device, so as to facilitate the maintenance of the optical fiber transmission line.

Figure 8:
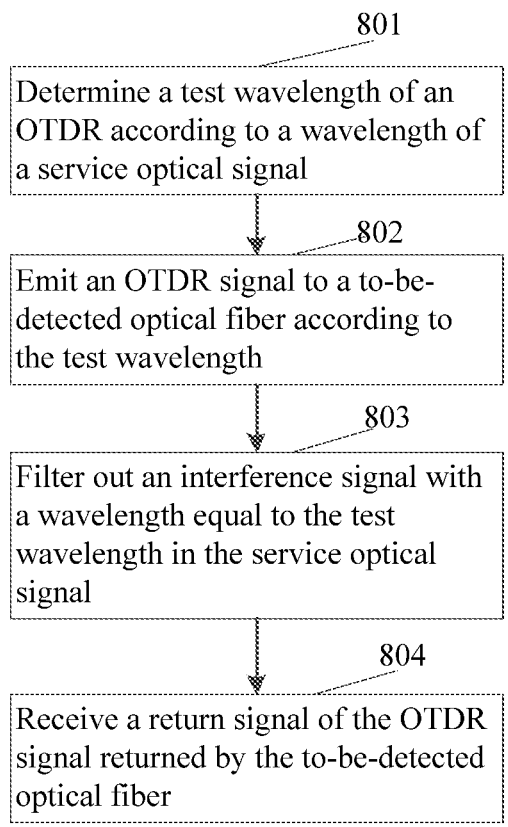
FIG. 8 is a flow diagram of an OTDR-based test method provided by an embodiment of the present disclosure.

Next, the embodiments of the present disclosure provide an OTDR-based test method. FIG. 8 is a flow diagram of an OTDR-based test method provided by an embodiment of the present disclosure. As shown in FIG. 8, the method comprises:

Step 801: determining a test wavelength of an OTDR according to a wavelength of a service optical signal;

Step 802: emitting an OTDR signal to a to-be-detected optical fiber according to the test wavelength;

Step 803: filtering out an interference signal with a wavelength equal to the test wavelength in the service optical signal;

Step 804: receiving a return signal of the OTDR signal returned by the to-be-detected optical fiber, wherein an emission parameter of the OTDR signal and a return parameter of the return signal are used for evaluating a performance index of an optical fiber connected with the output end of the WDM device.

In the embodiments of the present disclosure, the OTDR comprises an input end, a first filter, a WDM device, an OTDR basic unit, and an output end, wherein the input end is connected with the first filter, the first filter is connected with the reflection end of the WDM device in turn, the transmission end of the WDM device is connected with the OTDR basic unit, and the output end of the WDM device is connected with an output end of the OTDR.

In Step 801 of the present embodiment, the test wavelength of the OTDR is determined according to the wavelength of the service optical signal, so as to ensure that the test performance of the OTDR is not affected by the service optical signal transmitted in the optical fiber line.

In actual implementation, when determining the test wavelength of the OTDR, the wavelength of the service optical signal and the optical fiber attenuation coefficient should be comprehensively considered to select the wavelength with a low optical fiber attenuation coefficient, so as to reach a longer test distance. For example, it is 850 nm, 1550 nm and the like, and it is not specifically limited here.

It should be noted that in order to avoid the influence of the test of the OTDR on the service optical signal, when selecting the test wavelength of the OTDR, it should be avoided be consistent with the wavelength of the service optical signal as much as possible. For example, the test wavelength of the OTDR should avoid the DWDM standard wavelength range, the OSC wavelength range and the Raman pump wavelength range, etc., which is not specifically limited here.

In Step 802 of the present embodiment, according to the test wavelength, the processor of the OTDR drives the emission module of the OTDR basic unit to emit the OTDR signal corresponding to the test wavelength, and the OTDR signal is transmitted to the WDM device through an optical circulator, and then the WDM device sends the OTDR signal to the to-be-detected optical fiber connected with the output end of the OTDR.

In Step 803 of the present embodiment, the service optical signal is received through the input end of the OTDR, and the interference signal with the wavelength equal to the test wavelength in the service optical signal is filtered out through the first filter; the filtered service optical signal is transmitted to the WDM device, and then the WDM device sends the service optical signal to the to-be-detected optical fiber connected with the OTDR output end.

It should be noted that the application of various amplifiers in the optical transmission system leads to a widespread presence of the noise signal (e.g., ASE signal) in the optical fiber line, and the spectral distribution is relatively wide; and the noise signal may seriously interfere to the test performance of the OTDR. Before the WDM device multiplexes the service optical signal and the OTDR signal, the noise signal with a wavelength equal to the test wavelength in the service optical signal is filtered by the first filter, so as to reduce the test influence of the service optical signal on the OTDR in the optical fiber line.

As a result, through filtering out the interference signal with a wavelength equal to the test wavelength of the OTDR in the service optical signal by the first filter, the OTDR greatly reduces the interference signal falling within the test wavelength range of the OTDR in the service optical signal under the condition that the service optical signal is not influenced, so as to ensure that the test performance of the OTDR is not affected by the service optical signal transmitted in the optical fiber line.

In some embodiments, the Step 801 may comprise: when the service optical signal is an optical signal amplified by an erbium-doped fiber amplifier EDFA, determining the test wavelength of the OTDR according to a wavelength range of the service optical signal and a spectral distribution of the amplified spontaneous radiation ASE signal of the EDFA.

In the embodiments of the present disclosure, the EDFA comprises an erbium-doped optical fiber, a pump light source, a coupler, an optical isolator and an optical filter; the EDFA also generates amplifier ASE noise when performing power amplification on the service optical signal. The test wavelength of the OTDR is determined according to the wavelength range of the service optical signal and the spectral distribution of the ASE signal of the EFDA.

It should be noted that in the optical fiber amplifier, random incoherent spontaneous radiation of stimulated particles may also be generated along with activated particles returns from the excited state to the ground state and the optical signal is amplified; such spontaneous radiation may be in any direction, and may cause further stimulated radiation and may be amplified. Therefore, the ASE has a very wide frequency band which occupies the entire gain bandwidth.

In actual implementation, the wavelength range with lower ASE signal power is determined according to the spectral distribution of the ASE signal of the EDFA, so as to avoid the influence of the ASE signal of the EDFA amplifier on the test of the OTDR.

Figure 9:
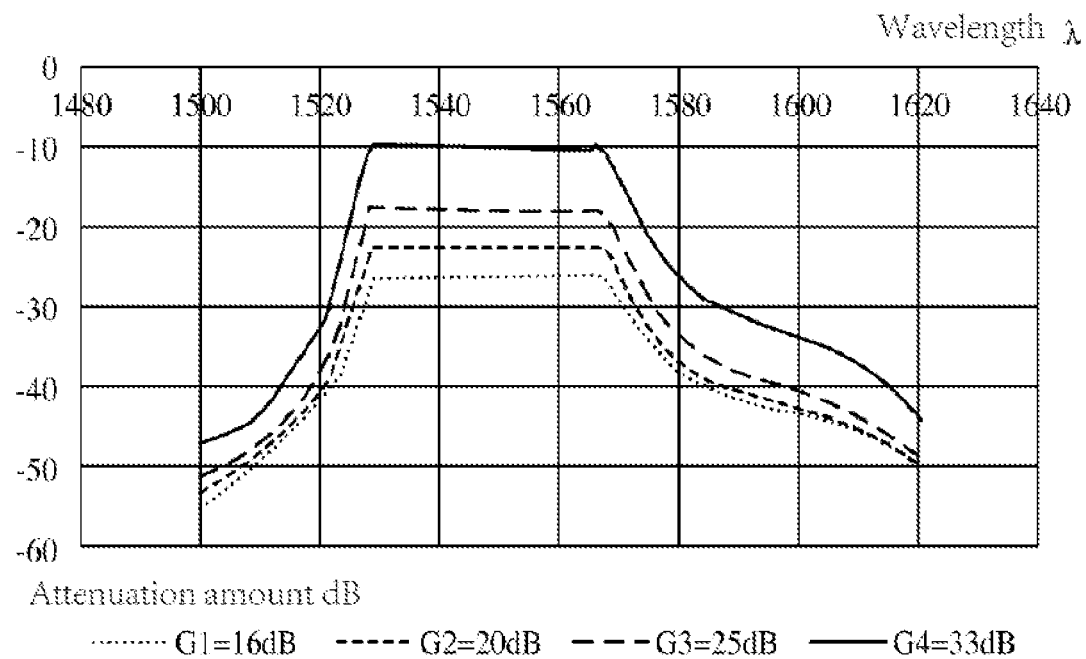
FIG. 9 is a spectral distribution diagram of an ASE signal generated by an EDFA.

Exemplarily, FIG. 9 is a spectral distribution diagram of an ASE signal generated by an EDFA. As shown in FIG. 9, there are an ASE signal spectral distribution curve under four different gains in FIG. 9. The power of the ASE of the EDFA is significantly reduced in a wavelength range less than 1528 nm and in a wavelength range higher than 1563 nm. Therefore, according to the spectral distribution of the ASE signal, the test wavelength of the OTDR may be selected in the wavelength range with lower ASE power in FIG. 9. For example, the test wavelength is less than 1520 nm, or higher than 1600 nm, etc.

As a result, in a system where the OTDR signal and the EDFA output signal are transmitted in the same direction, through filtering out the interference signal with a wavelength equal to the test wavelength in the ASE signal generated by the EDFA, the influence of the service optical signal on the OTDR signal in the optical fiber transmission line is reduced, so as to ensure that the test performance of the OTDR is not deteriorated.

In some embodiments, Step 804 comprises:
receiving a return signal of the OTDR signal, and recording the return parameter of the return signal, wherein the return parameter comprises return time and return power;
obtaining the emission parameter of the OTDR signal which is pre-recorded by the processor, wherein the emission parameter comprises emission time and emission power;
determining a length of the to-be-detected optical fiber according to the emission time of the OTDR signal and the return time of the return signal; and
determining an attenuation distribution curve of the to-be-detected optical fiber according to the emission parameter of the OTDR signal and the return parameter of the return signal.

In a practical application, the length of the to-be-measured optical fiber is calculated through recording the return time and return power of the return signal, and according to the emission time and emission power of the OTDR signal, also according to the time difference between the return time and the emission time, as well as the transmission speed of the light in the optical fiber; moreover, the attenuation distribution curve of the optical fiber is drawn according to the return power and the return time.

In this way, the performance index of the to-be-detected optical fiber is evaluated through the return parameter of the return signal and the emission parameter of the OTDR signal, so as to ensure the quality of the optical fiber transmission line.

The embodiments of the present disclosure further provide a computer storage medium. The computer storage medium stores a computer program, and after being executed by a processor, the computer program executes a data transmission method provided by one or more of the aforementioned technical solutions, for example, the method as shown in FIG. 8 may be executed.

The computer storage medium provided by the embodiments of the present disclosure comprises: a removable storage device, a read only memory (ROM, Read-Only Memory), a random access memory (RAM, Random Access Memory), a magnetic disk, or an optical disk and other media that may store program code. Optionally, the computer storage medium may be a non-transient storage medium. The non-transient storage medium here may also be called a non-volatile storage medium.

Figure 10:
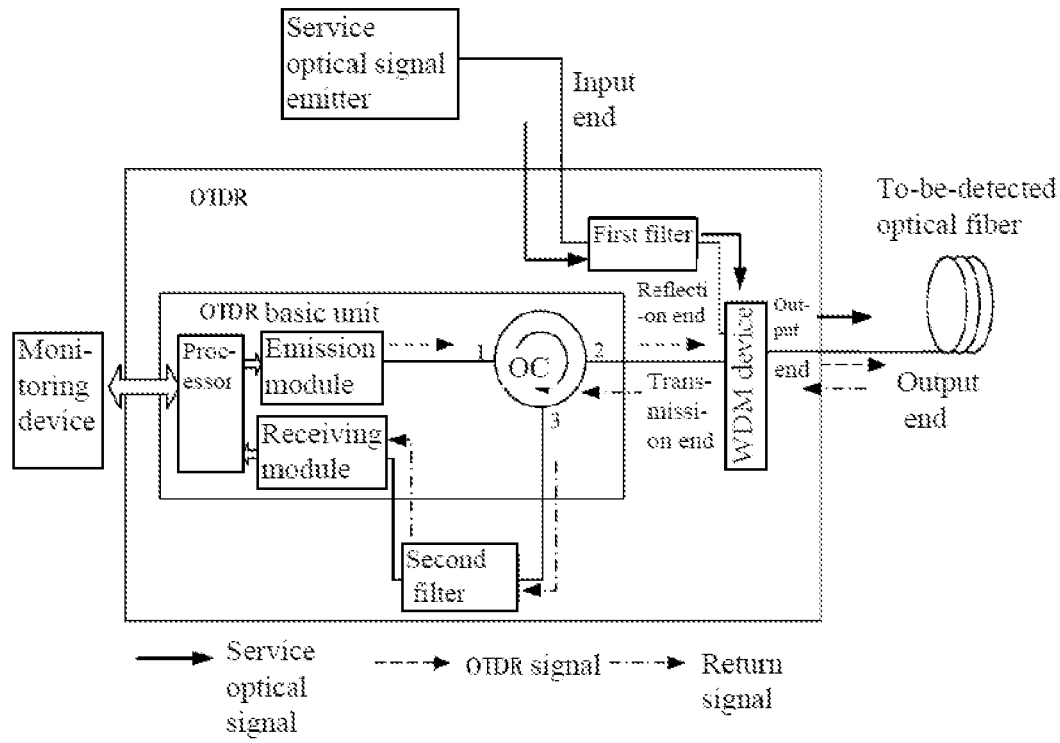
FIG. 10 is a schematic diagram of a flow direction of an optical signal within an OTDR provided by an embodiment of the present disclosure.

A specific example is provided below in combination with any of the above-mentioned technical solutions, The present example provides an OTDR-based test system, and the test system comprises:

an OTDR;

a to-be-detected optical fiber, a service signal emitter, wherein the OTDR comprises an input end, a first filter, a WDM device, a second filter, and an OTDR basic unit. FIG. 10 is a schematic diagram of a flow direction of an optical signal within an OTDR provided by an embodiment of the present disclosure. As shown in FIG. 10, a service optical signal received from the input end is filtered by the first filter, and then the filtered service optical signal is multiplexed with an OTDR signal emitted by the OTDR basic unit through the WDM device and is output to an optical fiber connected with the output end of the WDM device. A return signal of the OTDR signal is received through the WDM device, an interference signal in the return signal is filtered out through the second filter, and the filtered return signal is transmitted to the OTDR basic unit, so as to evaluate a performance index of the optical fiber.

In the present example, 1519 nm is selected as a test wavelength of the OTDR signal, and the spectral width of the OTDR signal is set to 1519 nm±1 nm; output optical pulse peak power of an emission module of the OTDR basic unit of the OTDR is 17 dBm, and a pulse width is 20 us. An EDFA gain is 33 dB, and an EDFA signal and the OTDR output signal are transmitted in the same direction.

It is assumed that the length of a transmission fiber line is 125 km, and the optical fiber loss coefficient of the signal with a wavelength of 1519 nm is about 0.2 dB/km; the first filter uses a single-stage coating filter and the second filter uses a two-stage coating filter.

According to the attenuation property of a conventional filter and a WDM device, it is assumed that V1=0.8 dB, V2=35 dB, V3=1.6 dB, V4=70 dB, V5=0.8 dB, V6=35 dB, V7=0.5 dB, V8=15 dB.

According to the spectral distribution of the ASE signal generated by the EDFA of FIG. 9, when the wavelength is 1519 nm, the power of the ASE signal is approximately −32.5 dBm; while an integral typical value of the Rayleigh scattering backward signal of the continuous optical signal in the transmission optical fiber is −32 dB. Therefore, within the wavelength range of 1519 nm±1 nm, after the ASE noise signal of the EDFA passes through the transmission optical fiber, the power of the backward integration power thereof at the output end of the OTDR is:

Pase_r=−32.5−35−15−32=−114.5 dBm

Here, Pase_r refers to an integral value of the backward Rayleigh scattering power of an ASE signal at an OTDR output end within a wavelength range of 1519 nm±1 nm.

If the service optical signal received from the input end of the OTDR is directly input from the reflection end of the WDM without being filtered by the first filter, then output from the output end of the OTDR; and then within the wavelength range of 1519 nm±1 nm, after the ASE noise signal of the EDFA passes through the transmission optical fiber, the power of the backward integration power thereof at the output end of the OTDR is:

Pase_r=−32.5−15−32=−79.5 dBm

The Rayleigh scattering coefficient of the pulse signal in a single-mode optical fiber is as follows:

$$K(\Delta t) = 10\log_{10}(K\Delta t)$$

$$K = S\alpha_s \frac{v}{2} s^{-1}$$

where S is a backscattering capture factor, and is related to a digital aperture of an optical fiber;

$$S = \left(\frac{NA}{n_0}\right)^2 \frac{1}{m},$$

for the single-mode optical fiber, m=4.55, NA is a digital aperture of the optical fiber, $n_0$ is a refractive index of the optical fiber; $\alpha_s$ is a scattering coefficient of the optical fiber; V is a propagation speed of light in the optical fiber, V=C/$n_0$, where C is the transmission speed of light in vacuum, no is the refractive index of the optical fiber; and $\Delta t$ is a width of an optical pulse signal.

In a commonly used single-mode optical fiber, such as G.652D, NA=0.14, the following is obtained by calculation: K=10 $s^{-1}$, for which logarithm is taken and is converted to ns, and when it is obtained that the pulse width is 1 ns, the backscattering coefficient is:

$K_{ns}$ (dB)=$K_s^{-1}$ (dB)−90dB≈−80dB

Here, $K_{ns}$(dB) refers to the backscattering coefficient of an optical pulse signal with a pulse width of 1ns at each point of the optical fiber line.

When the pulse width is $\Delta$tns, the backscattering coefficient is:

$K(\Delta t)$=10 $\log_{10}(K\Delta t)$=$K_{ns}$ (dB)+10 $\log_{10}(\Delta t)$ ≈−80+ 10 $\log_{10}(\Delta t)$ Here, $K_{ns}$(dB) refers to the backscattering coefficient of an optical pulse signal with a pulse width of 1ns at each point on the optical fiber line.

When the output optical pulse peak power of the OTDR is 17 dBm and the pulse width is 20 us, the backscattering coefficient obtained through calculation is −37 dB; and when the pulse width is 1 us, the backscattering coefficient obtained through calculation is −50 dB.

The attenuation coefficient of the optical signal with a wavelength of 1519 nm in the optical fiber is about 0.2 dB/km, and the optical power of the Rayleigh scattering optical signal of the OTDR optical pulse signal at 125 km which returns to the output end of the OTDR is:

when the pulse width is 20 us, 17−0.8−0.8−0.2×125×2−37=−71.6 dBm;

when the pulse width is 1 us, 17−0.8−0.8−0.2×125×2−50=−84.6 dBm.

It can be seen that if there is no first filter in the OTDR, the backward integration power of the ASE signal is −79.5 dBm, which is only 7.9 dB lower than the return signal power −71.6 dBm of the OTDR signal with a pulse width of 20 us returned from the optical fiber at 125 km, and which is 5.01 dB higher than the return signal with a pulse width of 1 us. However, for the OTDR comprising the first filter, the backward integration power of the ASE signal is −114.5 dBm, which is much less than the return signal power −71.6 dBm of the OTDR signal with a pulse width of 20 us and the return signal power −84.6 dBm of the OTDR signal with a pulse width of 1 us which both are returned from the optical fiber at 125 km.

The function of the second filter is for filtering the noise signal outside the test wavelength range in the return signal. In the co-directional transmission system, the service optical signal in the wide spectral range and the OTDR signal of the OTDR are transmitted in the same direction, and the service optical signal also generates the Rayleigh scattering in the transmission process.

It is assumed that the total power of the service optical signal transmitted in the same direction is 24 dBm, according to that the integral typical value of the Rayleigh scattering backward signal of the continuous optical signal in the transmission optical fiber is −32 dB, then at the output end of the OTDR, the power value of the reverse Rayleigh scattering of the service optical signal is:

$$24-0.8-9.8-32=-9.6 \text{ dBm};$$

the service optical signal returned after the Rayleigh scattering is transmitted to the receiving module of the OTDR basic unit after passing through the WDM device and the second filter, and the optical power of the service optical signal with a wavelength range of 1519 nm±1 nm is:

$$-9.6-35-70=-114.6 \text{ dBm};$$

if there is no second filter in the OTDR, the return signal is transmitted to the receiving module of the OTDR basic unit, and the optical power of the service optical signal with a wavelength range of 1519 nm±1 nm is:

$$-9.6-35=-44.6 \text{ dBm},$$

It can be seen that the returned Rayleigh scattered signal of the OTDR signal at the receiving module of the OTDR basic unit is:

when the pulse width is 20 us, −71.6−0.8−1.6=−74 dBm;
when the pulse width is 1 us, −84.6−0.8−1.6=−87 dBm.

Therefore, it can be seen that the second filter plays a critical filtering role on the reverse Rayleigh optical signal of the service optical signal. If there is no second filter in the OTDR, the reverse Rayleigh scattering signal power of the service optical signal reaches −44.6 dBm, which is much greater than the return signal power −74 dBm of the OTDR signal. However, for the OTDR comprising the second filter, the reverse Rayleigh scattered signal power of the service optical signal is −114.6 dBm, which is much less than the return signal power of the OTDR signal.

In the present embodiment, the first filter in the OTDR filters out the interference signal with a wavelength equal to the test wavelength in the co-directional transmission signal, and the second filter filters out the reverse Rayleigh scattering signal in the co-directional transmission signal, which greatly reduces the interference of the service optical signal in the transmission system on the OTDR signal of the OTDR, and greatly reduces the performance degradation of the online OTDR test system.

In the several embodiments provided in the present disclosure, it should be understood that the disclosed method and device may be implemented in other modes. The device embodiments described above are merely examples; for example, the division of the units is merely a logical function division, and there may be another division mode in actual implementation; for example, multiple units or components may be combined, or may be integrated into another system, or some features may be ignored or not executed. In addition, the coupling, or direct coupling, or communication connection between the various components shown or discussed may be the indirect coupling or communication connection through some interfaces and devices or units, and may be electrical, mechanical or in other forms.

The units described above as separate components may or may not be physically separated, and the component displayed as a unit may or may not be a physical unit, that is, they may be located in one place or distributed to multiple network units; and some or all of the units may be selected according to actual needs to realize the purpose of the solutions of the present embodiments.

In addition, each functional unit in each embodiment of the present disclosure may all be integrated into one processing module, or each unit may be separately used as a unit, or two or more units may be integrated into one unit; the above-mentioned integrated unit may be implemented in a form of hardware, or may be implemented in a form of hardware plus software functional units.

Those ordinary skilled in the art may understand that all or a part of the steps of implementing the above-mentioned method embodiments may be completed by means of hardware related to a program instruction, and the aforementioned program may be stored in a computer-readable storage medium, and when the program is executed, the steps of the above-mentioned method embodiments are executed; and the aforementioned storage medium includes various media that may store program codes, such as a removable storage device, a read-only memory (ROM, Read-Only Memory), a random access memory (RAM, Random Access Memory), a magnetic disk, or an optical disk, and the like.

The above description is only embodiments of the present disclosure and is not intended to limit the protection scope of the present disclosure. Any amendment, equivalent replacement and improvement made within the spirit and scope of the present disclosure are included within the protection scope of the present disclosure.

What is claimed is:

1. A test system based on an optical fiber time domain reflectometer OTDR, wherein the system comprises:
an OTDR, wherein the OTDR comprises an input end, which is used for receiving an input service optical signal; a first filter, which is connected with the input end and is used for filtering an interference signal in the service optical signal with a wavelength equal to a test wavelength of the OTDR; a wavelength division multiplexing WDM device, which has a reflection end, a transmission end and an output end, wherein the reflective end is connected with the first filter and is used for receiving the service optical signal filtered by the first filter; and an OTDR basic unit, which is connected with the transmission end and is used for emitting an OTDR signal with a wavelength equal to the test wavelength and receiving a return signal of the OTDR signal, wherein an emission parameter of the OTDR signal and a return parameter of the return signal are used for evaluating a performance index of an optical fiber connected with the output end of the WDM device;

wherein the output end of the WDM device is used for outputting the filtered service optical signal received from the reflection end, outputting the OTDR signal received from the transmission end, and receiving the return signal returned from the optical fiber;

a service signal emitter, which is connected with the input end of the OTDR, and is used for emitting a service optical signal;

a to-be-detected optical fiber, which is connected with an output end of the OTDR; and a monitoring device, which is connected with the OTDR and is used for determining the test wavelength of the OTDR according to a wavelength range of the service optical signal.

2. The test system of claim 1, wherein the monitoring device is further used for:

receiving and displaying a performance index of the to-be-detected optical fiber at the output end of the OTDR.

3. A test method based on an optical fiber time domain reflectometer OTDR, wherein the method comprises:

Determining, by a monitoring device which is connected with the OTDR, a test wavelength of the OTDR according to a wavelength range of a service optical signal emitted by a service signal emitter which is connected with an input end of the OTDR;

emitting an OTDR signal to a to-be-detected optical fiber according to the test wavelength;

filtering out an interference signal in the service optical signal whose wavelength is equal to the test wavelength; and receiving and analyzing a return signal of the OTDR signal returned by the to-be-detected optical fiber, wherein an emission parameter of the OTDR signal and a return parameter of the return signal are used for evaluating a performance index of an optical fiber connected with an output end of a wavelength division multiplexing WDM device.

4. The method of claim 3, wherein the determining a test wavelength of an OTDR according to a wavelength range of a service optical signal comprises:

when the service optical signal is an optical signal amplified by an erbium-doped fiber amplifier EDFA, determining the test wavelength of the OTDR according to the wavelength range of the service optical signal and a spectral distribution of a spontaneous emission ASE signal of the EDFA.

5. The method according to claim 3, wherein the receiving and analyzing a return signal of an OTDR signal returned by the to-be-detected optical fiber comprises:

receiving the return signal of the OTDR signal, and recording the return parameter of the return signal, wherein the return parameter comprises return time and return power;

obtaining the emission parameter of the OTDR signal which is pre-recorded by a processor, wherein the emission parameter comprises emission time and emission power;

determining a length of the to-be-detected optical fiber according to the emission time of the OTDR signal and the return time of the return signal; and determining an attenuation distribution curve of the to-be-detected optical fiber according to the emission parameter of the OTDR signal and the return parameter of the return signal.

6. The test system of claim 1, wherein the OTDR further comprises:

a second filter, which is connected with the OTDR basic unit and is used for filtering an interference signal in the return signal, wherein a wavelength of the interference signal in the return signal is not equal to the test wavelength.

7. The test system of claim 1, wherein the OTDR basic unit comprises:

an emission module, which is used for emitting the OTDR signal with the wavelength equal to the test wavelength;

a receiving module, which is used for receiving the return signal;

an optical circulator, which is respectively connected with the emission module, the receiving module, and the transmission end of the WDM device; and a processor, which is respectively connected with the emission module and the receiving module, and is used for obtaining the performance index according to the emission parameter of the OTDR signal and the return parameter of the return signal.

8. The test system of claim 7, wherein the optical circulator comprises:

a first port, a second port and a third port;

wherein the first port is connected with the emission module, the second port is connected with the transmission end of the WDM device, and the third port is connected with the receiving module.

9. A non-transitory computer-readable storage medium, wherein the computer-readable storage medium stores computer-executable instructions, when executed by a processor, capable of implementing a test method based on an optical fiber time domain reflectometer OTDR, wherein the method comprises:

determining, by a monitoring device which is connected with the OTDR, a test wavelength of the OTDR according to a wavelength range of a service optical signal emitted by a service signal emitter which is connected with an input end of the OTDR;

emitting an OTDR signal to a to-be-detected optical fiber according to the test wavelength;

filtering out an interference signal in the service optical signal whose wavelength is equal to the test wavelength; and receiving and analyzing a return signal of the OTDR signal returned by the to-be-detected optical fiber, wherein an emission parameter of the OTDR signal and a return parameter of the return signal are used for evaluating a performance index of an optical fiber connected with an output end of a wavelength division multiplexing WDM device.

10. The non-transitory computer-readable storage medium of claim 9, wherein the determining a test wavelength of an OTDR according to a wavelength range of a service optical signal comprises:

when the service optical signal is an optical signal amplified by an erbium-doped fiber amplifier EDFA, determining the test wavelength of the OTDR according to the wavelength range of the service optical signal and a spectral distribution of a spontaneous emission ASE signal of the EDFA.

11. The non-transitory computer-readable storage medium of claim 9, wherein the receiving and analyzing a return signal of an OTDR signal returned by the to-be-detected optical fiber comprises:

receiving the return signal of the OTDR signal, and recording the return parameter of the return signal, wherein the return parameter comprises return time and return power;

obtaining the emission parameter of the OTDR signal which is pre-recorded by a processor, wherein the emission parameter comprises emission time and emission power;

determining a length of the to-be-detected optical fiber according to the emission time of the OTDR signal and the return time of the return signal; and determining an attenuation distribution curve of the to-be-detected optical fiber according to the emission parameter of the OTDR signal and the return parameter of the return signal.

* * * * *